(12) United States Patent
Doerry et al.

(10) Patent No.: US 10,288,729 B2
(45) Date of Patent: May 14, 2019

(54) APODIZATION OF SPURS IN RADAR RECEIVERS USING MULTI-CHANNEL PROCESSING

(71) Applicant: National Technology & Engineering Solutions of Sandia, LLC, Albuquerque, NM (US)

(72) Inventors: Armin W. Doerry, Albuquerque, NM (US); Douglas L. Bickel, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 75 days.

(21) Appl. No.: 15/786,935

(22) Filed: Oct. 18, 2017

(65) Prior Publication Data
US 2018/0067205 A1    Mar. 8, 2018

Related U.S. Application Data

(62) Division of application No. 14/560,147, filed on Dec. 4, 2014, now Pat. No. 9,823,346.

(51) Int. Cl.
*G01S 7/41* (2006.01)
*G01S 13/90* (2006.01)
*G01S 7/292* (2006.01)

(52) U.S. Cl.
CPC .......... *G01S 13/9035* (2013.01); *G01S 7/292* (2013.01); *G01S 7/414* (2013.01); *G06T 2207/20212* (2013.01)

(58) Field of Classification Search
CPC ...... G01S 13/89–13/9094; G01S 7/414; G01S 7/292–7/2928; G01S 7/064; G06T 2207/20212; G06T 2207/20221
See application file for complete search history.

(56) References Cited

U.S. PATENT DOCUMENTS 4,975,704 A * 12/1990 Gabriel .................. G01S 13/87
                                                    342/25 C
5,631,655 A *  5/1997 Posey ..................... G01S 7/292
                                                    342/162

(Continued)

*Primary Examiner* — Matthew M Barker
(74) *Attorney, Agent, or Firm* — Medley, Behrens & Lewis, LLC (57) ABSTRACT

The various technologies presented herein relate to identification and mitigation of spurious energies or signals (aka "spurs") in radar imaging. Spurious energy in received radar data can be a consequence of non-ideal component and circuit behavior. Such behavior can result from I/Q imbalance, nonlinear component behavior, additive interference (e.g. cross-talk, etc.), etc. The manifestation of the spurious energy in a radar image (e.g., a range-Doppler map) can be influenced by appropriate pulse-to-pulse phase modulation. Comparing multiple images which have been processed using the same data but of different signal paths and modulations enables identification of undesired spurs, with subsequent cropping or apodization of the undesired spurs from a radar image. Spurs can be identified by comparison with a threshold energy. Removal of an undesired spur enables enhanced identification of true targets in a radar image.

8 Claims, 6 Drawing Sheets

(56) References Cited

U.S. PATENT DOCUMENTS

| | | | | |
|---|---|---|---|---|
| 5,900,833 | A * | 5/1999 | Sunlin | G01S 13/0209 342/22 |
| 6,898,331 | B2 * | 5/2005 | Tiana | G06T 5/50 345/617 |
| 7,148,861 | B2 * | 12/2006 | Yelton | G06T 15/04 340/946 |
| 7,280,068 | B2 * | 10/2007 | Lee | G01S 7/2813 342/179 |
| 8,509,354 | B2 * | 8/2013 | Fudge | H04L 27/1566 375/130 |
| 9,529,081 | B2 * | 12/2016 | Whelan | G01S 7/2923 |
| 2003/0198385 | A1 * | 10/2003 | Tanner | G06K 9/00 382/195 |
| 2015/0378014 | A1 * | 12/2015 | Koudelka | G01S 13/04 342/25 A |

* cited by examiner

APODIZATION OF SPURS IN RADAR RECEIVERS USING MULTI-CHANNEL PROCESSING

CROSS-REFERENCE TO RELATED APPLICATIONS

This application is a divisional application of, and discloses subject matter that is related to subject matters disclosed in, co-pending parent application U.S. Ser. No. 14/560,147, filed Dec. 4, 2014 and entitled "APODIZATION OF SPURS IN RADAR RECEIVERS USING MULTI-CHANNEL PROCESSING". The present application claims the priority of its parent application, which is incorporated herein by reference in its entirety for any purpose.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A radar system is composed of a plurality of components, whereby the components can exhibit some degree of non-ideal behavior, which can influence a purity or quality of a signal being processed by the radar system. Such components often exhibit non-linear behavior and/or other imbalances. In range-Doppler radar data, the effects of the non-linear behavior can be manifested as spurious signals, also known as "spurs". The spurs can lead to false indication of a target energy, thereby reducing the performance, accuracy, reliability, and/or general utility of the radar system.

Radar modes and systems that utilize range-Doppler radar data, and hence are subject to such performance degradation, include Synthetic Aperture Radar (SAR), Inverse-SAR (ISAR), Moving Target Indicator (MTI), Wide Area Search (WAS), etc.

In addition, imbalance in the channels of a quadrature demodulator can lead to ghosting that may also be characterized as spurious energy. Such quadrature demodulators may be employed more broadly than just for generating range-Doppler radar data.

A conventional approach for spur mitigation is to pay attention to component selection, circuit construction, circuit layout, and circuit fabrication to minimize the susceptibility to spur creation. Thereafter, heuristic techniques can be utilized to desensitize the radar to offending spurs. However, spurs can survive these measures, and may be of sufficient energy to render false targeting, alarms, etc.

Hence, even though electrical components continue to be developed that are stable over temperature and time, with an according expense, spurs can still be generated and added to a signal, leading to false targeting.

SUMMARY

The following is a brief summary of subject matter that is described in greater detail herein. This summary is not intended to be limiting as to the scope of the claims.

A plurality of embodiments are presented herein relating to identification of spurious energy in a radar signal and, further, apodization (e.g., cropping) of the spurious energy from a radar image subsequently formed from the radar signal. In an embodiment, the radar image can be a range-Doppler image or map.

Spurious energy is often evident in a radar image, and can be due to such effects as non-ideal component or circuit behavior. Such effects can result from I/Q imbalance, non-linear component behavior, additive interference (e.g. cross-talk, etc.), or other sources.

A location(s) of a spurious energy in the radar image may be influenced by suitably modulating a received signal prior to a spur entry point, and correspondingly demodulating the signal after the spur entry point. In an embodiment, the incoming signal can be a pulse-to-pulse phase modulation.

By applying a received input signal to two signal paths, whereby each signal path utilizes a different modulation, two radar images may be generated. Both of the radar images can include identical true target responses, but have different spurious energy responses.

In the first radar image, a first target pixel can be located at the same position as a second target pixel in the second radar image. Accordingly, if the first radar image and the second radar image are combined to form a combination radar image, in the combination radar image, the first target pixel from the first radar image will overlay the second target pixel from the second radar image to form a third pixel. Accordingly, the third pixel can contain an energy magnitude relating to an energy of the first target pixel from the first radar image and an energy magnitude relating to an energy of the second target pixel from the second radar image. The energy of the third pixel can exceed a threshold energy, and accordingly the third pixel can be identified as indicating a target.

Further, a first spurious energy pixel can occur in the first radar image, and a second spurious energy pixel can occur in the second radar image, wherein the respective locations of the first spurious energy pixel in the first radar image and the second spurious energy pixel in the second radar image can be different. Hence, in the combination radar image, the first spurious energy pixel is located differently to the second spurious energy pixel. Accordingly, the first spurious energy pixel only has its initial energy from the first radar image and the second spurious energy pixel only has its initial energy from the second radar image. Accordingly, in the combination radar image, the combined energies of the first spurious energy pixel location from both the first and second radar images, and the combined energies of the second spurious energy pixel location from both the first and second radar images, can each be less than the threshold energy, and thus, the first spurious energy pixel in the first radar image and the second spurious energy pixel in the second radar image can be determined to be spurious energies and removed from any target identification. The term "combined" is not meant to necessarily imply addition, but may include other functions such as selecting the minimum magnitude value of corresponding pixels in the first and second radar images.

In an alternative radar mode embodiment the first radar image and the second radar image can be processed for target detection, with a voting scheme to distinguish real target detections from inadvertent spurious false target detections. Only targets evident identically in the same location in both images are deemed to be real targets.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

DETAILED DESCRIPTION

Various technologies pertaining to identifying and removing one or more spurs generated in a radar imaging system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, while electrical components and circuitry can be designed to minimize an occurrence of one or more spurs in a radar system, spurs can still be generated with a magnitude of energy sufficient to lead to false targets being presented in an image, from which false alarms may accordingly be based. The various embodiments presented herein relate to identifying one or more spurs and removing (also referred to herein as "apodization") the spurs from a subsequently produced radar image.

Figure 1:
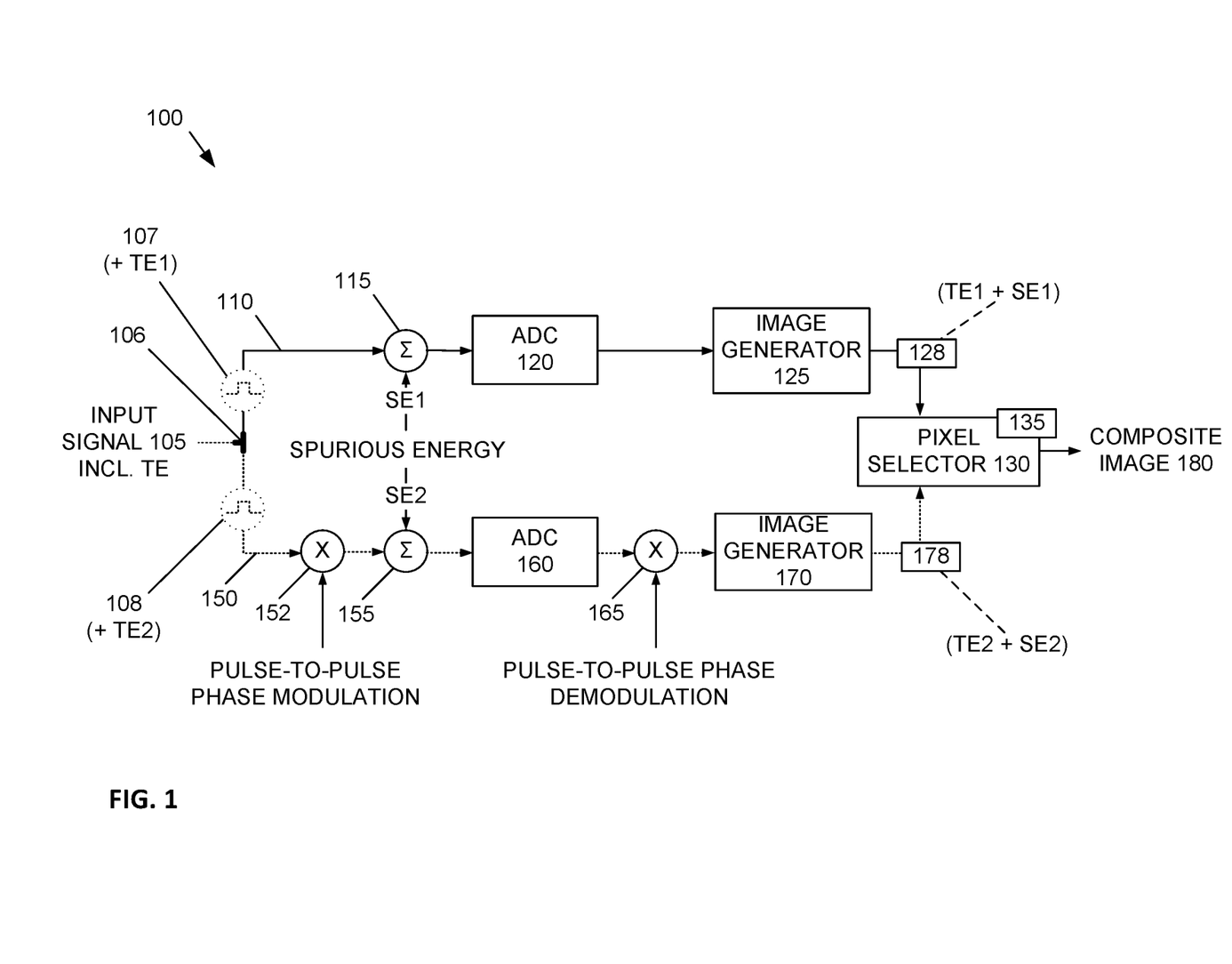
FIG. 1 illustrates a system for identifying and apodizing spurs during radar imaging, according to an embodiment.

FIG. 1 illustrates a system 100, whereby system 100 can be a radar system configured to receive and process a radar echo, e.g., input signal 105. The input signal 105 can be received at system 100 from an antenna, radar receiver, amplifier, etc., (not shown). In an aspect, the input signal 105 can comprise a plurality of radar pulses, e.g., as utilized in a SAR imaging radar. The input signal 105 includes an energy relating to a target, referred to herein as a "target energy" or "TE".

System 100 can comprise two signal paths (or channels), a first signal path 110 (indicated by the unbroken line in FIG. 1) and a second signal path 150 (indicated by the hashed line in FIG. 1). Each of the signal paths can include a plurality of individual and/or shared components. In an aspect, the first signal path 110 comprises components that are typically found in a conventional circuit utilized for processing of a radar echo signal, e.g., a first signal, for production of a conventional radar image. As previously mentioned, spurious energy can be added to a radar echo by one or more components, which will be manifest on the conventional radar image. The second signal path 150 also comprises phase modulation/demodulation components which can be utilized to add and remove a phase modulation to a second signal, as further described below.

The input signal 105 can be split at a splitter 106, with the input signal 105 being split into a first signal 107 and a second signal 108. The first signal 107 can be processed via the first signal path 110, and the second signal 108 can be processed via the second signal path 150. Processing of the first signal 107 via the first signal path 110 can be independent and different to processing of the second signal 108 via the second signal path 150. However, as further described herein, the two separate signals 107 and 108 can be subsequently combined to create the same radar image (e.g., a SAR image). The dual processing of signals 107 and 108 enables location of a spur to be discriminated from an energy of a true target.

In an aspect, by splitting of the input signal 105 into the first signal 107 and the second signal 108, one or more signal energies (pulses) which are present in the input signal 105 will also be represented in the first signal 107 and the second signal 108. Accordingly, target energy, TE, present in the input signal 105, will also be represented (e.g., as TE1) in the first signal 107 and also represented (e.g., as TE2) in the second signal 108. In an aspect, TE1 and TE2 can have respective energy magnitudes equal to the energy of TE present in the input signal 105 (e.g., as a result of an amplification process, not shown). In another aspect, TE1 and TE2 can have respective energy magnitudes disparate to the energy of TE. In a further aspect, TE1 and TE2 can have respective energy magnitudes that are equal. In another aspect, TE1 and TE2 can have respective energy magnitudes that are disparate. Further, TE1 and TE2 can have the same initial phase. In an aspect, TE, TE1, and TE2 can have the same phase, e.g., the initial phase of TE1 and TE2 is based upon the TE phase.

FIG. 1 does not illustrate any particular elements that can engender a spur(s), however, as shown, a spur(s) can be added to the first signal 107 prior to, or during, conversion of the first signal 107 from an analog format to a digital format. As shown in FIG. 1, an unintentional entry point (or creation point) for spurious energy, SE1, can occur at the adder point 115. It is to be appreciated that while the addition of the spurious energy is indicated to occur prior to analog-to-digital convertor (ADC) 120, the addition of the spurious energy can also occur at the ADC 120 during conversion of the first signal 107 from an analog format to a digital format.

Following the analog to digital conversion, the first signal 107 (now in digital form) can be processed at an image generator component 125 (e.g., a range-Doppler image generator), wherein the image generator component 125 is configured to form a radar image 128 based upon output of the ADC 120. As mentioned, the first signal 107 being passed to the image generator component 125 can include TE1 and SE1, hence, any radar image 128 generated by the image generator component 125 can include information not only relating to a detected target but also for one or more spurs generated during processing of the first signal 107.

System 100 can further include a pixel selector 130 that is in communication with the image generator component 125, whereby the pixel selector 130 can be configured to combine a plurality of radar images to form a composite radar image. The pixel selector 130 can be further configured to analyze the composite radar image to discern energies relating to targets and spurs. As further described below, the radar image 128 can be input into the pixel selector 130 (in conjunction with a corresponding radar image 178) to enable a composite radar image 180 to be formed, and subsequently analyzed.

Turning now to the second signal path 150, the second signal path 150 includes an ADC 160 and an entry point 155 for spurious energy SE2. In addition, the signal path 150 can further include a phase modulator 152 that is operably coupled to an input of the ADC 160, and a phase demodulator 165 that is operably coupled to an output of the ADC 160. Second signal 108 can include the target energy TE2. At initial conveyance of the second signal 108 along the second signal path 150, the phase modulator 152 can modulate the phase (e.g., pulse-to-pulse) of the second signal 108. The phase modulation can apply any suitable amount of phase shift to the second signal 108. In an embodiment, a phase modulation applied by the phase modulator 152 can be a rolling phase shift with increments of $\pi/2$ radians per pulse. Accordingly, an initial pulse in the second signal 108 can undergo a 90° phase shift from a reference value, the next pulse can undergo a 180° phase shift, the next pulse can undergo a 270° phase shift, etc. As shown in FIG. 1, the application of a phase modulation is performed prior to an entry point 155 of any spurious energy.

As further described herein (per FIG. 2), the phase modulation of the second signal 108 can cause information in the second signal 108 (e.g., TE2) to be shifted in comparison with the corresponding information included in the first signal 107. Hence, when the second signal 108 is later demodulated, TE2 will be shifted back to its original value(s) while a location of energy forming a spur SE2 will also be shifted from a value at the instance of the spur formation (e.g., at the entry point 115) to a value shifted by the demodulation.

The second signal 108, having been phase modulated, comprising TE2 and spurious energy SE2 received at the entry point 155, is subsequently received at the ADC 160. The ADC 160 converts the second signal 108 (having been phase modulated and comprising TE2 and spurious energy SE2 received at the entry point 155) from an analog format to a digital format. It is to be appreciated that the ADC 160 located on the second signal path 150 can be a common component with the ADC 120 that is located on the first signal path 110. In an alternative embodiment, the ADC 160 can be a separate component to the ADC 120.

After the ADC 160 converts the second signal 108 into digital data, and beyond the entry point 155 at which SE2 can enter the second signal path 150, the aforementioned pulse-to-pulse phase modulation can be removed, or compensated for. The phase demodulator 165 can be utilized to demodulate the second signal 108, whereby demodulation is performed in accordance with the modulation applied by the phase modulator 152. For example, if a phase modulation of $\pi/2$ is applied to a pulse in second signal 108 at the phase modulator 152, a phase modulation of $-\pi/2$ can be applied at the phase demodulator 165 to demodulate the pulse in the second signal 108.

Hence, during the phase modulation, TE2 in the second signal 108 will be shifted (e.g., by $\pi/2$), while owing to the first signal 107 having undergone no phase modulation/demodulation, TE1 in the first signal 107 remains at its original value throughout processing along the first signal path 110. The effects upon phase modulation and demodulation are further described in the schematic 200 presented in FIG. 2.

Following phase demodulation, the second signal 108 (now in digital form) can be processed at an image generator 170 to form a radar image 178. The second signal 108 being passed to the image generator 170 can include TE2 and SE2, but owing to the application of the phase demodulation, the location of SE2 in the second signal 108 will be different to the location of SE1 in the first signal 107. Accordingly, the location of SE1 in the radar image 128 will be in a different location to the location of the corresponding spur, SE2, in the second radar image 178.

Thus, the first radar image 128 and the second radar image 178 can be received and compared at a pixel selector 130. The pixel selector 130 can be included in the system 100 at the junction of the first signal path 110 and the second signal path 150. The pixel selector 130 can generate a composite radar image 180 by combining the radar image 128 with the radar image 178. Owing to TE1 and TE2 both being identically located in the composite radar image 180, the energy of a pixel, PTE, of the identical location can be the lesser of TE1 and TE2, e.g., a minimum energy of the TE1 pixel or the TE2 pixel (e.g., PTE=min(TE1, TE2)). Typically, TE1 equals TE2, so PTE contains significant energy from a real target. However, owing to SE1 and SE2 being displaced from each other in the composite radar image 180, a pixel, PSE1, compares and selects the minimum of the original energy of SE1 in the first image 128 with no spurious energy in the corresponding pixel in the second image 178, and accordingly, a pixel, e.g., PSE2, compares and selects the minimum of the original energy of SE2 in the second image 178 with no spurious energy in the corresponding pixel in the first image 128. Pixels in either image where spurious energy is absent may still contain typically small amounts of residual noise as is common in radio and radar receivers.

In an embodiment, the pixel selector 130 can receive and/or include a pixel energy threshold 135, whereby the pixel energy threshold 135 can be an energy threshold utilized by the pixel selector 130 to determine whether an energy of a pixel in the composite radar image 180 is due to spurious energy (e.g., PSE1 or PSE2 has an energy that is less than the pixel energy threshold 135) or is a target energy (e.g., PTE has an energy that is equal to, or exceeds, the pixel energy threshold 135). Based upon a determination that a pixel has a spurious energy, the pixel selector 130 can apodize (e.g., remove) the pixel (e.g., PSE1 and PSE2) from the composite radar image 180, whereby the pixel selector 130 can output the composite radar image 180 which only includes one or more pixels, PTE, having a target energy. The pixel identification and apodization process is further described at FIGS. 3-6.

Figure 2:
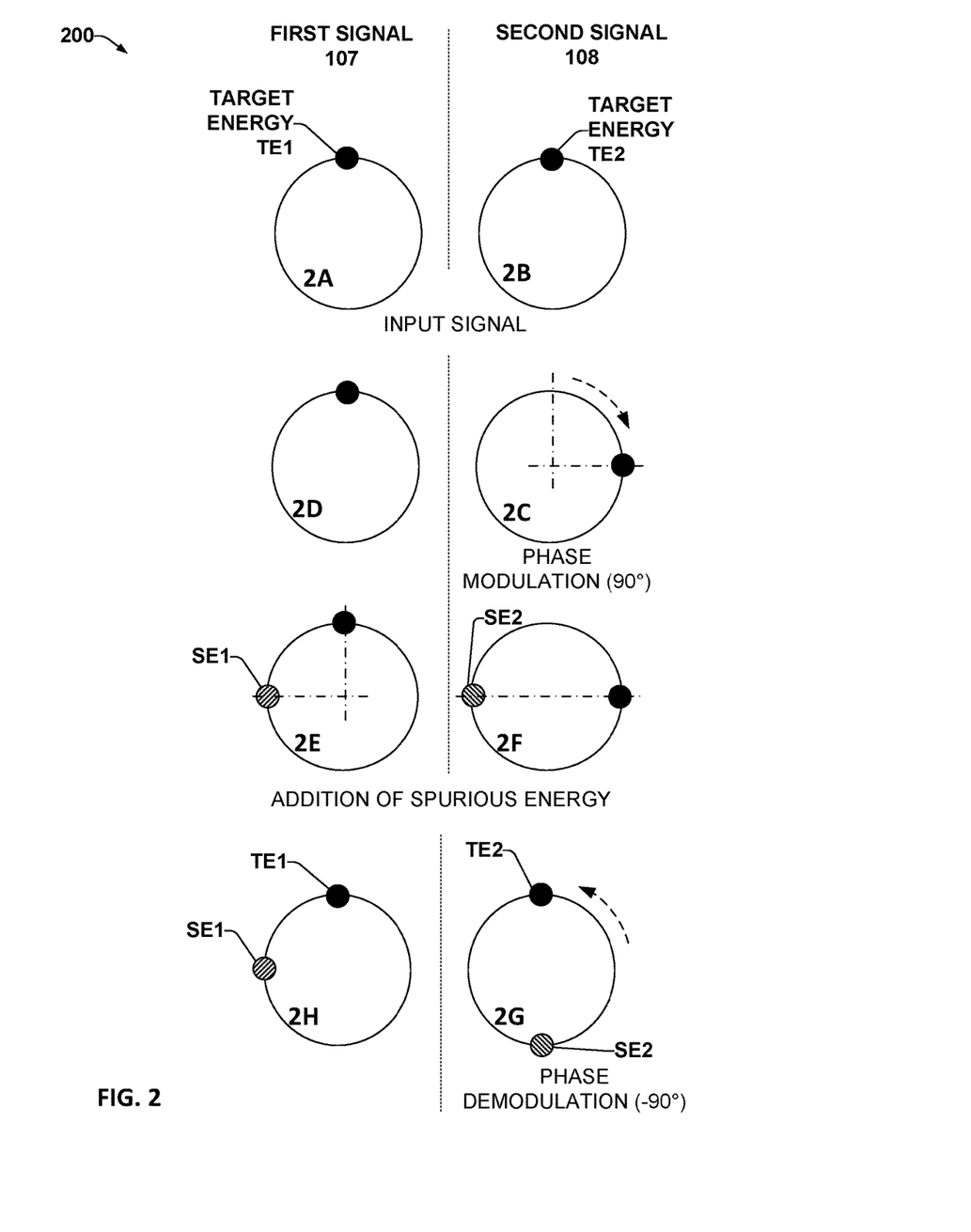
FIG. 2 presents a schematic illustrating relocating a spur based upon modulation and de-modulation of a radar signal, according to an embodiment.

Turning to FIG. 2, a schematic representation 200 is presented to facilitate understanding of the effect of the phase modulation and phase demodulation with respect to a target energy and a spurious energy, e.g., with regard to radar images 128 and 178.

As shown at FIGS. 2A and 2B, an initial signal (e.g., an input signal 105) comprising a target energy (e.g., TE) is split to form a first signal (e.g., the first signal 107) and a second signal (e.g., the second signal 108). The first signal includes a target energy TE1, and the second signal includes a target energy TE2, whereby their respective energies are the same, and the respective phase of target energy TE1 and of target energy TE2 are the same (e.g., 0°).

As previously described, the second signal can undergo phase modulation (e.g., by phase modulator 152). In an example embodiment, the phase can be shifted in accordance with a π/2 modulation schema. Accordingly, as shown in FIG. 2C, the phase of TE2 can be shifted such that, after phase modulation, TE2 is shifted by 90°. It is to be appreciated that other phase shifts can occur in accordance with the π/2 modulation schema, or any other modulation schema that is utilized in accordance with the various embodiments presented herein. As shown in FIG. 2D, the first signal does not undergo any phase modulation, and accordingly, TE1 is still at its initial phase (e.g., 0°). Hence, the application of the phase modulation has resulted in the phase of the second signal to be 90° out of phase to the phase of the first signal.

At FIGS. 2E and 2F the spurious energy (e.g., respectively SE1 and SE2) finds its way into the first signal and the second signal. SE1 and SE2 can have a common initial phase, or they can have initial phases that are respectively disparate. Further, an energy magnitude of SE1 can be equal to an energy magnitude of SE2, and alternatively, an energy magnitude of SE1 can be disparate to an energy magnitude of SE2.

As previously mentioned, the spurious energy can be from a non-linear effect generated by an element in a radar system (e.g., system 100) and is added (e.g., at respective entry points 115 and 155). The spurious energy can have a phase of 270°, and accordingly, the phase of SE1 is −90° out of phase with respect to the phase of TE1, and further the phase of SE2 is 180° out of phase with respect to the modulated phase of TE1.

At FIG. 2G the second signal undergoes demodulation (e.g., by the phase demodulator 165). The phase demodulation can be equal but opposite to the phase modulation applied at FIG. 2C, hence a phase demodulation of −90° can be applied (e.g., to counteract the modulation of 90°). As shown, TE2 is returned to its initial phase of 0°, while the phase of SE2 is shifted to a phase of 180°.

Further, as shown in FIG. 2H the first signal undergoes no demodulation, and accordingly, TE1 still has a phase of 0°, while SE1 still has its initial phase of 270°.

Hence, following demodulation, the phase of TE2 (per FIG. 2G) is the same as the phase of TE1 (per FIG. 2H). However, the respective phases of SE1 and SE2 are disparate by 90°. Thus, when a first radar image (e.g., a radar image 128) formed from the first signal is combined (or overlaid) with a second radar image (e.g., a radar image 178) formed from the second signal to form a composite radar image (e.g., a composite radar image 180), energies from TE1 and TE2 will coincide, and can be compared so as to select the minimum of TE1 and TE2, at pixel PTE, while the energies of spurs SE1 and SE2 do not coincide (e.g., the respective locations of corresponding energies are displaced), and accordingly, pixels PSE1 and PSE2 can be identified based upon comparison (e.g., selecting the minimum energy) of a pixel in the first radar image to the corresponding pixel in the second radar image where only one has spurious energy and the other does not, owing to its displacement to another pixel location. If the selected minimum energy is less than a pixel energy threshold (e.g., pixel energy threshold 135), then it may be apodized from the composite radar image.

Figure 3:
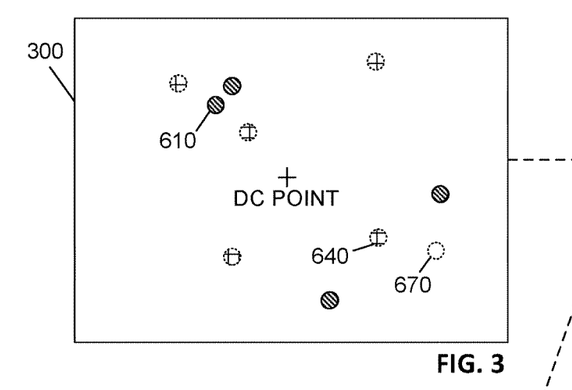
FIG. 3 illustrates a radar image comprising of spur pixels and target pixels, according to an embodiment.
Figure 4:
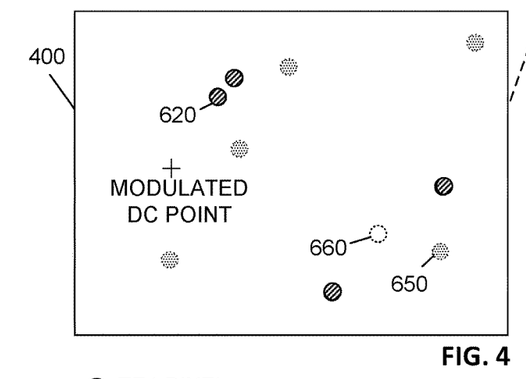
FIG. 4 illustrates a radar image comprising of spur pixels and target pixels, according to an embodiment.

FIGS. 3-6 illustrate a pair of radar images being combined to form a composite image, followed by spur identification and apodization. FIG. 3 depicts a first radar image 300 (e.g., comparable to radar image 128) which is formed from a first signal (e.g., the first signal 107) processed via a first signal path (e.g., the first signal path 110). FIG. 4 depicts a second radar image 400 (e.g., comparable to radar image 178) which is formed from a second signal (e.g., the second signal 108) processed via a second signal path (e.g., the second signal path 150), wherein the second signal utilized to form the second radar image 400 has undergone phase modulation and demodulation, as previously described. As shown, the pixels having a target energy TE1 in FIG. 3 are located at the same positions as the positions of the pixels having a target energy TE2 in FIG. 4. For example, a TE1 pixel 610 is located in the first radar image 300 at the same respective position as a TE2 pixel 620 in the second radar image 400. Hence, as further described, pixels 610 and 620 are co-located at pixel 630 in a composite radar image 500.

However, the locations of the SE1 spurious energy pixels in the first radar image 300 are located differently to the locations of the SE2 spurious energy pixels in the second radar image 400, as a result of the phase modulation and demodulation of the second signal. For example, a SE1 pixel 640 is located at a different position in the first radar image 300 than the position of SE2 pixel 650 in the second radar image 400. It is to be noted that a pixel 660 located in a same respective position in the second radar image 400 as the SE1 pixel 640 in the first radar image 300 has minimal or zero energy (e.g., the energy is background noise energy). Similarly, a pixel 670 located in a same respective position in the first radar image 300 as the SE2 pixel 650 in the second radar image 400 has minimal or zero energy (e.g., the energy can be background noise energy).

Further shown on FIG. 3 is a direct current point or a "DC point" is a 2-dimensional zero-frequency point, while FIG. 4 illustrates a position of a "modulated DC point". The "DC point" is a point about which a spur, or a ghost, is rotated relative to a DC-point of raw data at an ADC (e.g., ADC 120 or 160) for some spurs (e.g. those due to I/Q imbalance), and can correspond to a zero-Doppler frequency at the ADC, and not necessarily after any pulse-to-pulse phase demodulations or corrections to the digital data in a signal (e.g., signal 107 or 108) prior to generating the image 300 or 400. Consequently, by moving the location of the DC point of the raw data (e.g., FIG. 4 versus FIG. 3), the location of a spur (e.g., SE2) or ghost target is moved while a target energy (e.g., TE1 and/or TE2) remains in a true location.

Figure 5:
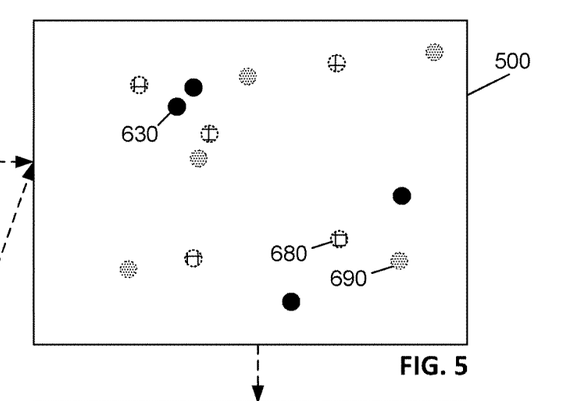
FIG. 5 illustrates a composite radar image comprising of spur pixels and target pixels, according to an embodiment.

Accordingly, when the first radar image 300 and the second radar image 400 are combined (e.g., by the pixel selector 130) to form a composite radar image 500 (e.g., comparable to the composite radar image 180) the target pixels PTE formed from the TE1 and TE2 pixels 610 and 620 are identically located. However, the respective spurious energy pixels SE1 (e.g., pixel 640) and SE2 (e.g., pixel 650) are displaced from each other. The SE1 pixel 640 is co-located in the composite radar image 500 with the minimum energy pixel 660, and the SE2 pixel 650 is co-located in the composite radar image 500 with the minimum energy pixel 670. It is to be appreciated that while former spur locations are indicated in composite radar image 500, the act of combining images may in fact render no significant residual spur energy at the former spur locations.

The composite radar image 500 can be processed (e.g., by the pixel selector 130) such that only pixels having a magnitude that is equivalent or exceeds a particular threshold are retained (e.g., PTE pixels energy=min(TE1, TE2) pixels>threshold), and any pixels (e.g., SE1 pixels and SE2 pixels) having a magnitude less than the threshold are identified and rejected. For example, a minimum threshold energy can be utilized on respective pixel pairs at a respective pixel location in the composite radar image 500. For example, a threshold value of x can be defined, whereby any pixel in a pixel pairing that has an energy less than x, then the pixel pairing is determined to comprise of spurious energy. Continuing the example, a target energy TE can have a value of y, whereby y>x. Accordingly, when either of TE1 pixel 610 and TE2 pixel 620 are compared to the threshold energy, both the TE1 pixel 610 and TE2 pixel 620 are identified to have a target energy and hence PTE pixel 630 (e.g., the co-location of the TE1 pixel 610 and the TE2 pixel 620) can be identified as a target energy pixel.

The SE1 pixel 640 can have an energy that is ≥x, however the minimum energy pixel 660 has an energy $z_1$<x. Hence, when the SE1 pixel 640 and the minimum energy pixel 660 are compared with x, it is possible to identify SE1 pixel 640 as being formed from spurious energy as the co-located minimum energy pixel 660 has an energy $z_1$<x. Similarly, the SE2 pixel 650 can have an energy that is ≥x, however the minimum energy pixel 670 has an energy $z_2$<X. Hence, when the SE2 pixel 650 and the minimum energy pixel 670 are compared with x, it is possible to identify SE2 pixel 650 as being formed from spurious energy as the co-located minimum energy pixel 670 has an energy $z_2$<x. Hence, the pixel 680 at the co-location of the SE1 pixel 640 and the co-located minimum energy pixel 660 can be identified as being a spurious energy pixel. Also, the pixel 690 at the co-location of the SE2 pixel 650 and the co-located minimum energy pixel 670 can be identified as being a spurious energy pixel.

FIG. 5 only illustrates the SE1 pixel 680 and the SE2 pixel 690, but it is to be appreciated, that while not shown, the minimum energy pixels 660 and 670 are respectively co-located with the SE1 pixel and the SE2 pixel.

Figure 6:
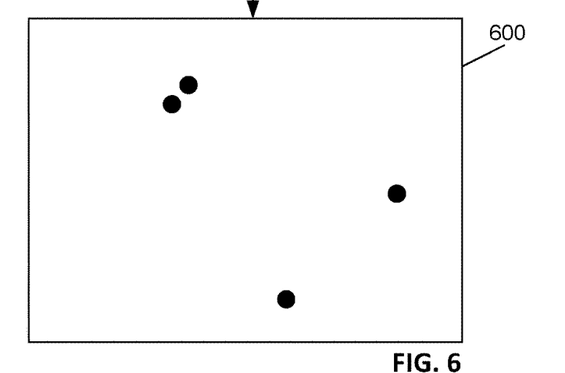
FIG. 6 illustrates a composite radar image processed to remove any spurs with only target pixels remaining, according to an embodiment.

FIG. 6 illustrates a composite radar image 600 (e.g., comparable to the composite radar image 180), which is the state of composite radar image 500 after an apodization operation has been performed (e.g., by the pixel selector 130), whereby, only the PTE pixels (e.g., pixels 610 and 620) indicating the target regions min(TE1, TE2) are retained, while the spurious energy pixels SE1 (e.g., pixel 640) and SE2 (e.g., pixel 650) have been removed.

In another embodiment, owing to the PTE pixel being identified as relating to a target, the correlation can be made that the target pixels relating to TE1 and TE2 in the respective radar images 128 and 178 also identify a target. Similarly, the correlation can be made that the pixels in radar images 128 and 178 with energies SE1 and SE2 are spurious energy pixels.

It is to be appreciated that while the foregoing describes combining a first radar image (e.g., radar image 128) with a second radar image (e.g., radar image 178) to facilitate forming a composite image (e.g., composite images 180, 500 and 600) to enable identification and removal of one or more spurs, the various embodiments presented herein can be applied to other image processing techniques. For modes where the radar image(s) is further processed for target detection, such as for MTI modes or WAS modes, it is possible to forego combining the two radar images 128 and 178, and perform target detection operations on the two radar images independently. In an embodiment, a voting scheme can be utilized such that only detections common to both radar images (e.g., in both images 300 and 400) will be reported, and those detections (e.g., SE1 and SE2) not present (e.g., identically located) in both radar images 128 and 178 will be culled from reported target detections.

In another embodiment, an examination can be performed to determine a complex covariance (e.g., coherence) between the two radar images 128 and 178 as an indicator of a location(s) of a spurious energy (e.g., SE1 and/or SE2). The covariance can be subsequently utilized as a mask to pass only legitimate true targets (e.g., only TE1 and TE2).

Further, while the foregoing embodiments are presented with regard to a radar system where a first signal path (e.g., the first signal path 110) receives no pulse-to-pulse modulation, while a second signal path (e.g., the second signal path 150) undergoes pulse-to-pulse modulation/demodulation, the operations and componentry of FIGS. 1-4 was limited to illustrate that different modulation schemes on two signal paths will yield different spurious energy locations with respect to location(s) of a true target. Accordingly, other modulation schemes or signal processing can be applied to either or both of the signal paths (e.g., signal paths 110 and/or 120), such that spurious energy is displaced differently from a first signal path to a second signal path with respect to the true target location(s).

As previously mentioned, a spurious energy can be generated from a plurality of sources, such as components operating on, or associated with, a signal path. For example, a spurious energy can result from I/Q imbalance. Radar signal processing often employs quadrature demodulation, where radar echoes are demodulated to baseband to generate complex data (e.g. with each data sample exhibiting real and imaginary numerical components, also known as in-phase 'I' and quadrature 'Q' components, respectively). Sometimes creation of I/Q components is performed with analog signals and processing, and sometimes creation of I/Q components is performed with digital data.

With analog quadrature demodulation a radar signal can be split into separate analog channels, thereby allowing for analog component differences to manifest an imbalance between I and Q data characteristics.

With digital quadrature demodulation a radar signal can be sampled at an intermediate frequency with final down-conversion to I and Q components using digital signal processing (DSP). However the nature of the processing is often such that non-ideal behavior of an ADC can still manifest an imbalance between I and Q data characteristics.

In either case, it is quite common for the resulting data to manifest an imbalance between I and Q components. This can result in "ghost" target echoes that mirror the true target echoes with a symmetry characterized as a 180 degree rotation about a 2-dimensional zero-frequency point in the image.

Another source for spurious energy is non-linearities in an ADC (e.g., ADC's 120 and 160). An ADC can be configured to render an analog voltage at its input into digital words that represents quantized versions of a specific time samples of the input voltage. A typical ADC is configured to quantize input voltages with linear increments of amplitude. However, in spite of the design intent, some degree of non-linearity is inevitable. That is, there is an inherent non-linearity in the ADC conversion process, the non-linearity is undesirable even though it may typically be small.

The unknown and undesired nonlinearity aspects of an ADC can be embodied in the ADC's Differential Nonlinearity (DNL) and its Integral Nonlinearity (INL) specifications. As with all non-linear functions, the effect to the signal is to generate harmonics and other mixing products that corrupt the data. This can occur inside of the ADC, and is unaffected by any filters that precede the ADC. Furthermore, these spurious harmonics and mixing products can alias unimpeded by any filters.

In an aspect, harmonic spurs may be shifted in range as well as Doppler. Consequently, spurious energy can manifest anywhere in a radar image (e.g., a range-Doppler map). Furthermore, different harmonic spurs may exhibit any combination of same or different range and/or Doppler.

A further source for spurious energy is additive interference. Both I/Q imbalance and ADC nonlinearity can generate spurious energy, but require a legitimate true target signal to be present to do so.

However, other spurious energy can manifest in radar images even without the presence of a true target signal. These are termed additive spurious energy, also known as additive interference. Such additive spurious energy is often the result of undesired coupling of legitimate signals, but via undesired coupling paths. This is not uncommon in high-speed mixed-signal printed wiring boards, even in spite of careful circuit design, and can be particularly problematic for large dynamic-range systems like coherent radar systems.

Hence, while not shown in FIG. 1, a first signal processing component located in the first signal path 110 can be source for spurious energy, as a result of I/Q imbalance, nonlinearity, additive interference, etc. Also, while not shown in FIG. 1, a second signal processing component located in the second signal path 150 can also be a source for spurious energy, as previously described.

Figure 7:
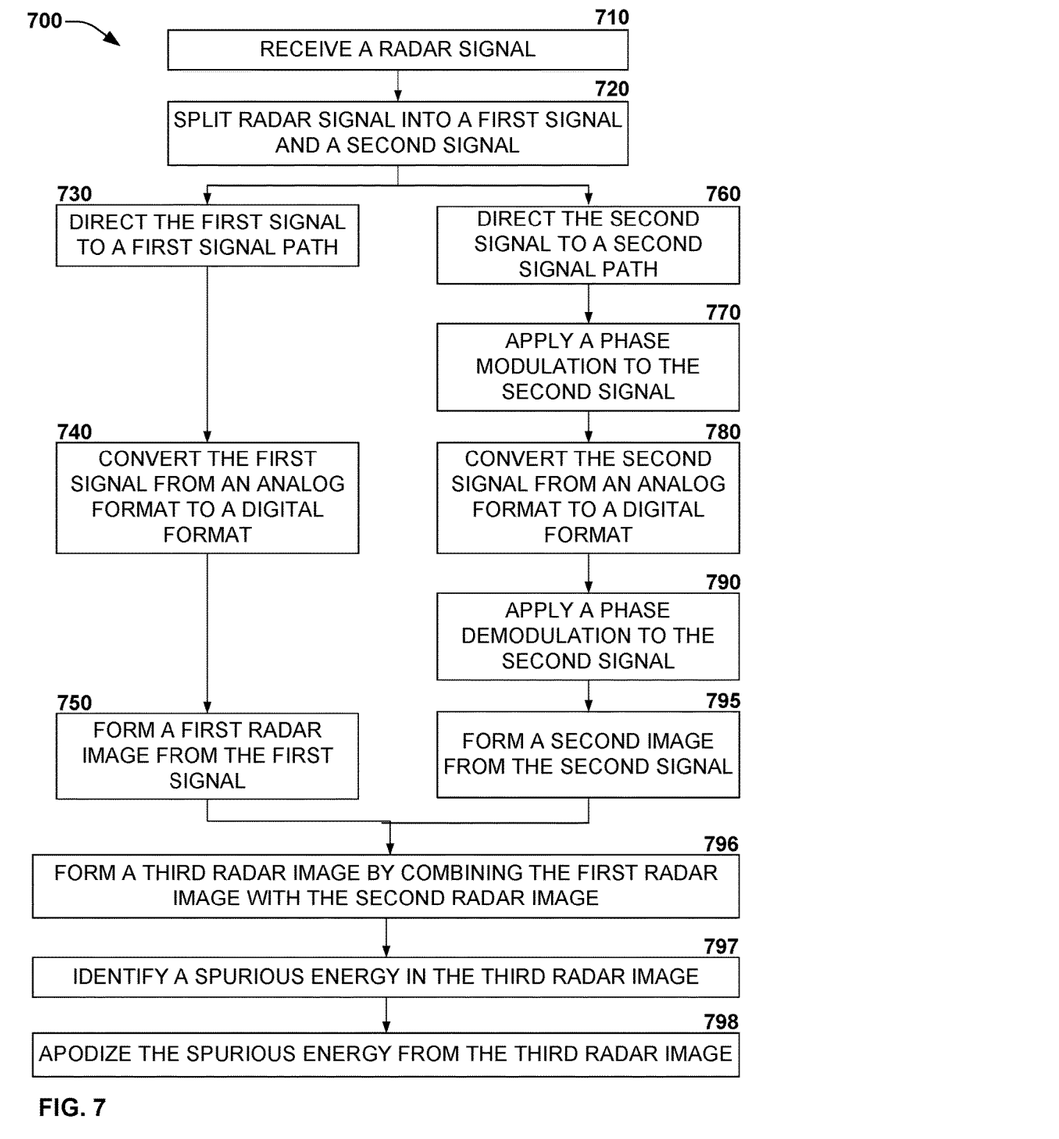
FIG. 7 is a flow diagram illustrating an exemplary methodology for identifying and apodizing spurs during radar imaging for target identification.
Figure 8:
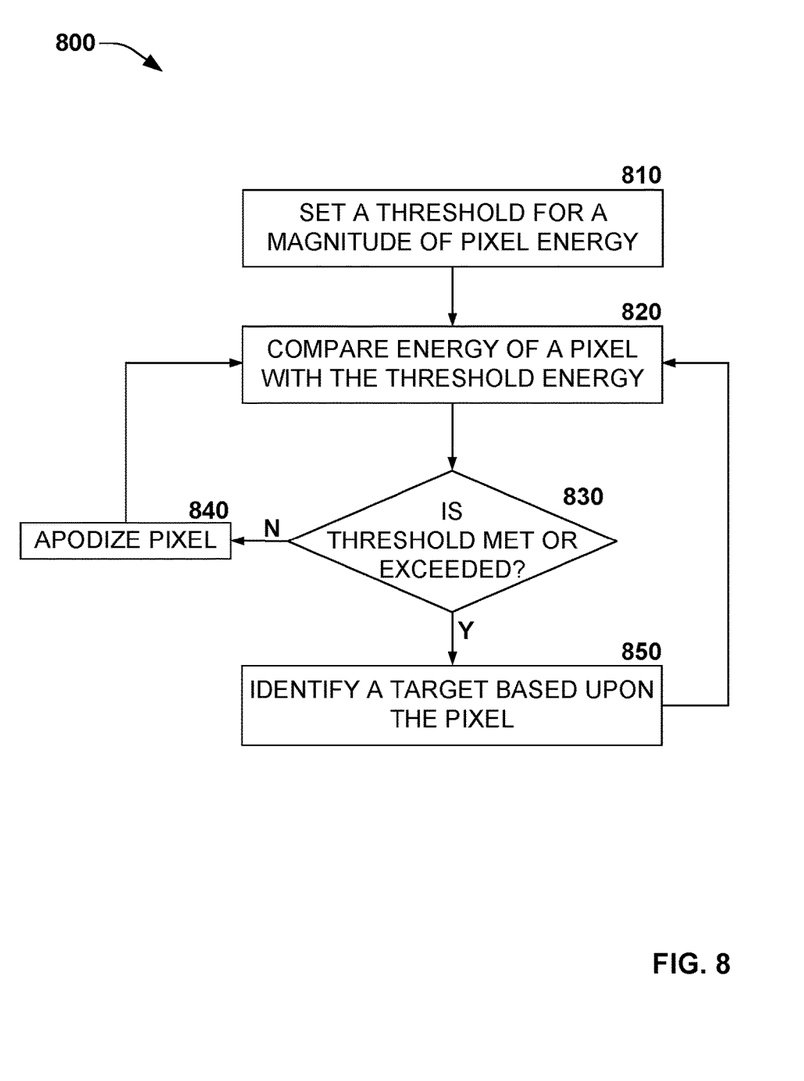
FIG. 8 is a flow diagram illustrating an exemplary methodology for determining and apodizing a spur pixel based upon an energy threshold.

FIGS. 7 and 8 illustrate exemplary methodologies relating to identifying and apodizing spurs in a radar image(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 7 illustrates a methodology 700 relating to identifying one or more spurs being generated in a radar imaging system, and based thereon, apodizing the one or more spurs from a radar image to enable improved target detection. At 710, a signal comprising a plurality of radar echoes (or pulses) is received at a radar system. The radar echoes can include information relating to a target (e.g., a target energy TE). The signal can be received via an antenna, a radar receiver component, etc.

At 720, the received signal can be split into a first signal and a second signal, whereby information included in the first signal is also in the second signal. Accordingly TE is present as TE1 in the first signal and as TE2 in the second signal. Splitting of the received signal into the first signal and the second signal can be performed by a signal splitter.

At 730, the first signal can be directed from the signal splitter to a first signal path.

At 740, the first signal can undergo processing including conversion from an analog format to a digital format. The signal conversion can be performed by a first ADC. During processing and/or signal conversion, the first signal can be affected by spurious energy (e.g., SE1) being added to the first signal per the various components incorporated into the first signal path.

At 750, the first signal can be utilized to form a first radar image, whereby the first radar image can include pixels corresponding to TE1 and SE1.

Returning to 720, the received signal can be split into the second signal. At 760, the second signal can be directed from the signal splitter to a second signal path.

At 770, the second signal can undergo phase modulation, whereby any suitable phase modulation schema can be utilized, for example, a phase modulation schema of $\pi/2$. Accordingly, a phase of TE2 can be shifted per the phase modulation.

At 780, the second signal can undergo processing including conversion from an analog format to a digital format. The signal conversion can be performed by a second ADC. During processing and/or signal conversion, the second signal can be affected by the spurious energy (e.g., SE2) being added to the second signal per the various components incorporated into the second signal path. Accordingly, the second signal now includes TE2 and SE2.

At 790, the second signal can undergo phase demodulation. The phase demodulation can be conducted to counter the phase shift applied during the phase modulation. Accordingly, TE2 can return to its original phase while SE2 will now have a phase different to that with which it was originally formed at 780.

At 795, the second signal can be utilized to form a second radar image, whereby the second radar image can include pixels corresponding to TE2 and SE2.

At 796, a third radar image can be formed, wherein the third radar image is formed as a composite of information included in the first radar image with information included in the second radar image. Owing to the co-location of a TE1 pixel and a TE2 pixel, an energy of the co-located pixel PTE can be the minimum energy of the TE1 pixel or the TE2 pixel (e.g., PTE=min(TE1, TE2)). Pixels in the third radar image relating to SE1 will have the lesser energy of the original SE1 and a pixel(s) comprising no spur energy, and pixels in the third radar image relating to SE2 will have the lesser energy of the original SE2 and a pixel(s) comprising no spur energy.

At 797, the third image can be processed to identify one or more instances of spurious energy. As previously described, by applying modulation to a second signal and subsequently demodulating the second signal, any spurious energy pixels SE2 that may occur in the second image will be at a different location to any spurious energy pixels SE1 that are in the first image. Accordingly, the respective energies of PTE, SE1 and SE2 pixels can be compared with an energy threshold to facilitate identifying a pixel as a pixel formed with a target energy or a spurious energy.

At 798, the third image can be further processed to apodize any spurious energy pixels (e.g., SE1 and SE2) present in the third image, with only target energy pixels PTE remaining.

FIG. 8 illustrates a methodology 800 relating to determining whether the energy of a pixel in a radar image exceeds a threshold to enable a target to be identified. At 810, a threshold is defined for a magnitude of pixel energy. The threshold can be configured such that any pixel having an energy that is equal to or greater than the magnitude of the defined pixel energy, the pixel is determined to be a real value and can be utilized in identifying a target. Alternatively, if the pixel energy is less than the threshold, then the pixel energy can be determined to not be a real value, and the pixel energy is determined to be from a spurious energy, or more generally that no true target energy is present. The threshold pixel energy can be defined in a pixel selector, whereby the pixel selector can be configured to receive a radar image comprising a plurality of pixels.

At 820, per the foregoing, an energy of a pixel in the radar image can be compared with the pixel energy threshold. As previously mentioned, the radar image can be formed from a composite of a first radar image and a second radar image. The first radar image can include a first pixel having a target energy TE1, a second pixel having a spurious energy SE1, and a third pixel having a first minimal energy. The second radar image can include a fourth pixel having a target energy TE2, a fifth pixel having a spurious energy SE2, and a sixth pixel having a second minimal energy. Accordingly, owing to the co-location of the first pixel TE1 and the fourth pixel TE2, a corresponding seventh pixel in the composite radar image, pixel PTE, can have an energy equal to a minimum of the first pixel TE1 and the fourth pixel TE2 (e.g., PTE=min(TE1,TE2)). Further, owing to the second pixel SE1 and the fifth pixel SE2 not being co-located, an eighth pixel in the composite image corresponding to the location of the second pixel SE1 and the third pixel, and a ninth pixel in the composite image corresponding to the location of the fifth pixel SE2 and the sixth pixel, the eighth pixel and the ninth pixel will only have an energy of the lesser of their respective spurious energies (SE1 or SE2) from their formation or the minimal energy associated with the respective third pixel and sixth pixels.

At 830, a determination can be made, based in part on the comparison between the pixel energy and the pixel energy threshold, whether the pixel energy exceeds or equals the threshold, or the pixel energy is less than the threshold. Accordingly, the energy of PTE can equal or exceed the threshold, while the energies of SE1 and SE2 can be below the threshold.

At 840, based upon a determination the pixel energy (e.g., SE1 or SE2) is less than the threshold energy, the pixel is determined to comprise spurious energy, and the pixel energy does not relate to a real target. Accordingly the pixel can be apodized from the radar image. Upon apodizing the pixel, the flow can return to 820, whereupon the next pixel in the radar image can be compared against the pixel energy threshold.

Returning to 830, in response to a determination that the pixel energy (e.g., PTE) meets or exceeds the threshold, at 850, the pixel can be identified as having a true energy, and accordingly, the pixel indicates a target in the pixel image and is retained. The flow can return to 820, whereupon the next pixel in the radar image can be compared against the pixel energy threshold.

The various embodiments presented herein enable radar systems to be assembled from lower quality components as compared to conventional systems, as spurious energies generated by the system componentry is allowed to occur. Hence, a radio frequency (RF) circuit can be incorporated into an integrated circuit. Further, a number of channels can be proximate to each other.

Figure 9:
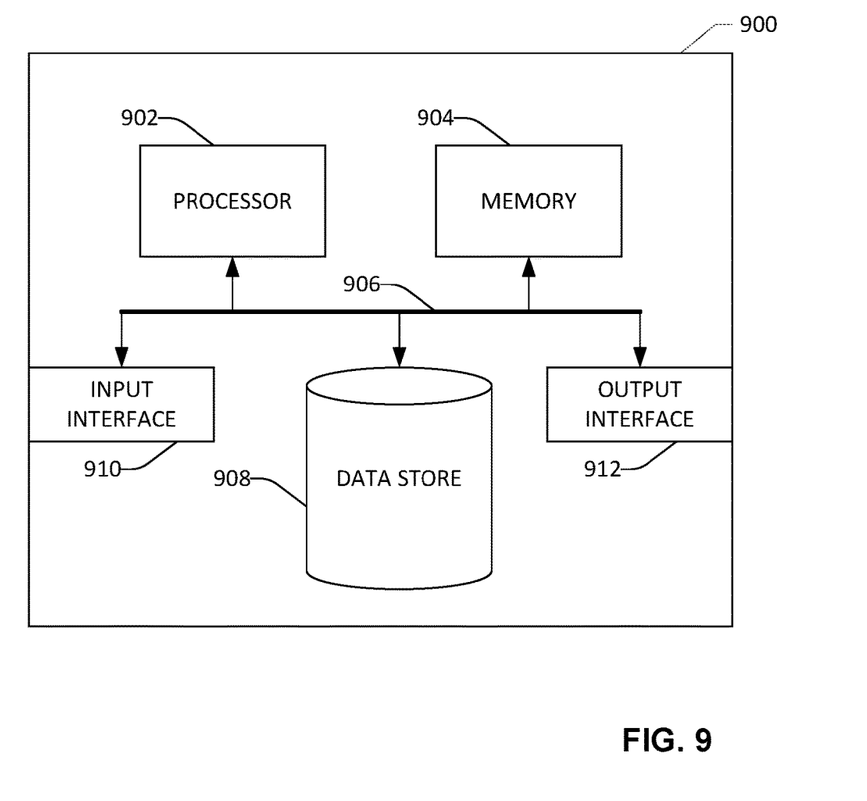
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be utilized to modulate and de-modulate one or more signals to enable one or more spurs to be identified in a radar image during target identification, whereby the computing device can control the phase modulation/demodulation operations. Further, the computing device 900 can operate as the pixel selector 130 as utilized to determine whether pixels are target pixels or spurious energies. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store operating parameters, required operating parameters, and so forth.

The computing device 900 additionally includes a data store 908 that is accessible by the processor 902 by way of the system bus 906. The data store 908 may include executable instructions, operating parameters, required operating parameters, etc. The data store 908 can store the threshold energy value 135, and any images 128, 178, 180, 300, 400, 500, 600, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc., by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, field-programmable gate arrays (FPGAs), application-specific integrated circuits (ASICs), application-specific standard products (ASSPs), system-on-a-chip systems (SOCs), complex programmable logic devices (CPLDs), radio frequency integrated circuits (RFICs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   receiving a first signal, the first signal being a radar signal;
   generating a first radar image of a scene based on the first signal;
   responsive to receiving a second signal, the second signal being a radar signal, shifting a phase of the second signal relative to a phase of the first signal prior to addition of spurious energy to the second signal, wherein the second signal is shifted from an initial phase to a second phase;
   shifting the phase of the second signal subsequent to addition of spurious energy to the second signal such that the second signal is shifted from the second phase to the initial phase;
   generating a second radar image of the scene based on the second signal subsequent to the phase shifting;
   generating a composite radar image of the scene, the composite radar image formed from a combination of the first radar image and the second radar image, the composite radar image comprising a first pixel, a value of the first pixel based on a value of a second pixel in the first radar image and a value of a third pixel in the second radar image,
   comparing a first energy magnitude of the first pixel with a threshold energy; and
   labeling, in response to the first energy magnitude of the first pixel being greater than the threshold energy, the first pixel as being a pixel identifying a target.

2. The method of claim 1, further comprising:
   comparing a second energy magnitude of a fourth pixel in the composite radar image with the threshold energy; and
   identifying, in response to the second energy magnitude of the fourth pixel being less than the threshold energy, the fourth pixel to have an energy resulting from a spurious energy.

3. The method of claim,2 further comprising:
   converting the first signal from an analog format to a digital format, the converting of the first signal from the analog format to the digital format causing a first spurious energy to be added to the first signal; and
   converting the second signal from the analog format to the digital format, wherein the converting of the second signal from the analog format to the digital format occurs after phase shifting of the second signal from the initial phase to the second phase, and the converting of the second signal from the analog format to the digital format causing a second spurious energy to be added to the second signal.

4. The method of claim 3, wherein phase shifting the second signal from the second phase to the initial phase occurs after the converting the second signal from the analog format to the digital format.

5. The method of claim 4, wherein phase shifting of the second signal from the second phase to the initial phase of the second signal causes an initial phase of the second spurious energy to phase shift to a third phase, wherein the third phase of the second spurious energy being disparate to a phase of the first spurious energy.

6. The method of claim 5, wherein the generating of the first radar image is performed subsequent to the analog to digital conversion of the first signal.

7. The method of claim 1, further comprising responsive to receiving a third radar signal, splitting the third radar signal into the first signal and the second signal.

8. The method of claim 1, wherein the phase shifting of the second signal causes a phase of spurious energy in the second signal to be disparate from a phase of spurious energy in the first signal.

* * * * *